United States Patent
Minamino

(10) Patent No.: US 8,228,969 B2
(45) Date of Patent: Jul. 24, 2012

(54) PSEUDO-ECHO CANCELLATION PROCESSING APPARATUS, PSEUDO-ECHO CANCELLATION METHOD AND DIGITAL-BROADCAST RECEIVING APPARATUS

(75) Inventor: Takanori Minamino, Kanagawa (JP)

(73) Assignee: Sony Corporation, Tokyo (JP)

( * ) Notice: Subject to any disclaimer, the term of this patent is extended or adjusted under 35 U.S.C. 154(b) by 951 days.

(21) Appl. No.: 12/252,446

(22) Filed: Oct. 16, 2008

(65) Prior Publication Data

US 2009/0103670 A1    Apr. 23, 2009

(30) Foreign Application Priority Data

Oct. 18, 2007    (JP) ................. P2007-271466

(51) Int. Cl.
*H04B 1/00* (2006.01)
(52) U.S. Cl. ...................................................... 375/130
(58) Field of Classification Search .................. 375/130
See application file for complete search history.

(56) References Cited

U.S. PATENT DOCUMENTS

2006/0078072 A1*   4/2006   Cheon et al. .................. 375/326

FOREIGN PATENT DOCUMENTS

| JP | 2004 242325 | 8/2004 |
| JP | 2005 333300 | 12/2005 |
| JP | 2006 203485 | 8/2006 |

* cited by examiner

*Primary Examiner* — Kevin M. Burd
*Assistant Examiner* — Tanmay Shah
(74) *Attorney, Agent, or Firm* — Frommer Lawrence & Haug LLP; William S. Frommer

(57) ABSTRACT

Disclosed herein is a pseudo-echo cancellation processing apparatus including: a correlator for computing a complex mutual-correlation value, that is, the value of a mutual correlation between the real part of a complex baseband signal of a received input-signal sequence and a reference-signal sequence included in the input-signal sequence as well as the value of a mutual correlation between the imaginary part of the complex baseband signal and the reference-signal sequence; and a processing section configured to carry out processes of: pre-storing complex vectors each representing pseudo-echo components; detecting a complex mutual-correlation value having a peak of powers of the complex mutual-correlation values; delaying the detected complex mutual-correlation value by a delay time corresponding to successive symbols; carrying out a complex multiplication operation; and adding a complex mutual-correlation value to an original complex mutual-correlation value.

7 Claims, 9 Drawing Sheets

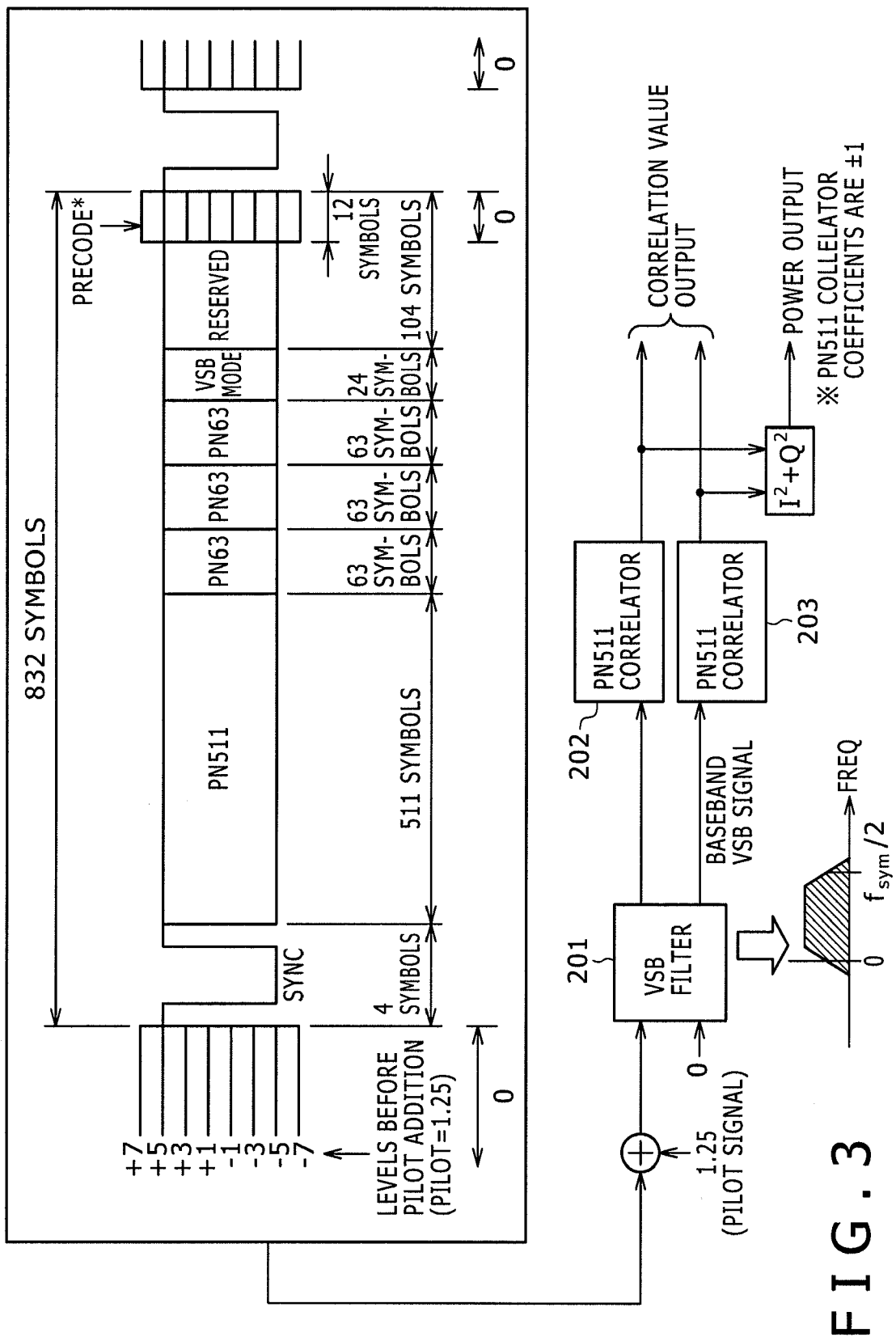
F I G. 3

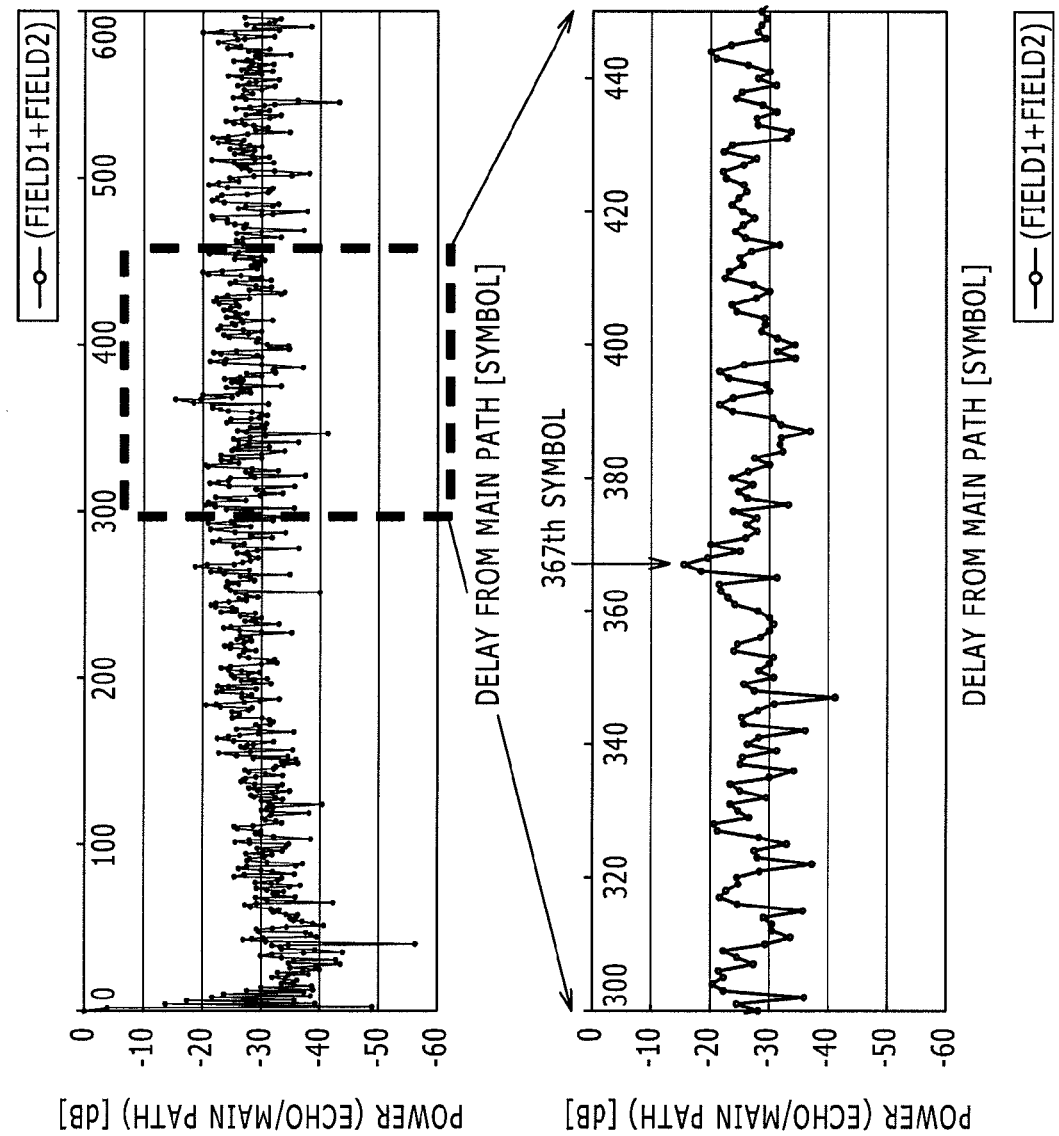
F I G. 5

FIG. 8

| | SECOND PN63 NON-INVERSION | | SECOND PN63 INVERSION | | SECOND PN63 NON-INVERSION AND INVERSION AVERAGE | |
|---|---|---|---|---|---|---|
| | i | q | i | q | i | q |
| VECTOR 366 | 0.081732438 | 0.06256057 | -0.081732438 | -0.06256057 | 0.081732438 | 0.06256057 |
| VECTOR 367 | -0.092294975 | 0.112465246 | 0.092294975 | -0.112465246 | -0.092294975 | 0.112465246 |
| VECTOR 368 | -0.07093443 | -0.026677221 | 0.07093443 | 0.026677221 | -0.07093443 | -0.026677221 |

PSEUDO-ECHO CANCELLATION PROCESSING APPARATUS, PSEUDO-ECHO CANCELLATION METHOD AND DIGITAL-BROADCAST RECEIVING APPARATUS

CROSS REFERENCES TO RELATED APPLICATIONS

The present invention contains subject matter related to Japanese Patent Application JP 2007-271466 filed in the Japan Patent Office on Oct. 18, 2007, the entire contents of which being incorporated herein by reference.

BACKGROUND OF THE INVENTION

1. Field of the Invention

The present invention relates to a pseudo-echo cancellation processing apparatus, a pseudo-echo cancellation method adopted in the pseudo-echo cancellation processing apparatus and a digital-broadcast receiving apparatus employing the pseudo-echo cancellation processing apparatus.

2. Description of the Related Art

In recent years, in the field of DTVs (Digital Televisions), research on high-performance DTV receivers and high-performance digital set top boxes are carried out intensively and extensively. US digital broadcasting ATSC (Advanced Television Sub Committee) specifications prescribe a VSB (Vestigial Side Band) signal for DTV signal transmissions.

As shown in a diagram of FIG. 1, a VSB data frame transmitted to a DTV includes two fields. One of the two fields has 313 segments. The first segment of each of the fields is a field synchronization signal. The field synchronization signal has 832 symbols. FIG. 2 is a diagram showing the field synchronization signal including first four symbols serving as a segment synchronization signal of the field synchronization signal. As shown in the diagram of FIG. 2, the four first consecutive symbols have four levels, i.e., +5, −5, −5 and +5 levels respectively.

The segment synchronization signal is a signal identifying the beginning of the first one of the 313 segments composing a field. Since the first segment serving as the field synchronization signal has 832 symbol and the segment synchronization signal of the first segment includes four symbols, the number of remaining symbols in the first segment is 828. As a matter of fact, the number of remaining symbols in every segment is also 828 as shown in the diagram of FIG. 1.

The field synchronization signal shown in the diagram of FIG. 2 represents the start point of a data field which includes data+(and) an FEC (Forward Error Correction) as shown in the diagram of FIG. 1. The field synchronization signal also functions as a reference signal of a channel equalizer. In addition, the field synchronization signal also functions as a reference signal for determining whether or not to use an NRF (NTSC Rejection Filter).

On top of that, the field synchronization signal is also used for confirming a channel characteristic and for determining a loop performance of a phase tracer in some cases.

The concrete structure of the field synchronization signal is shown in the diagram of FIG. 2. As shown in the diagram of this figure, the field synchronization signal includes sequences such as a PN511 sequence, a PN63 sequence, a VSB mode and a reserved sequence where PN is an abbreviation for Pseudo random Number. Having a length of 511 symbols, the PN511 sequence is used as a training sequence for a channel equalizer.

Much like the PN511 sequence, the PN63 sequence is also used as a training sequence for a channel equalizer. The field synchronization signal includes a total of three PN63 sequences. A specific one of the three PN63 sequences is used for determining whether the field synchronization signal including the PN63 sequences is the field synchronization signal of the first or second fields. That is to say, the sign of the specific PN63 sequence included in the first field is the inversion of the sign of the specific PN63 sequence included in the second field. In this way, the first and second fields can be distinguished from each other.

Having a length of 24 symbols, the VSB mode is a sequence representing the transmission data presently being transmitted. That is to say, the VSB mode is used for indicating whether the data transmission system is a 15VSB system or an 8VSB system. The reserved sequence is a free area having a size of 104 symbols.

If a ground wave broadcast signal with a VSB format having one carrier is used, it is difficult for a DTV receiver to receive the ground wave broadcast signal transmitted through multipath. Thus, a firm signal receiving system is absolutely required as a system capable of receiving such a ground wave broadcast signal since it is difficult for a DTV receiver to receive a ground wave broadcast signal. In order to receive a VSB signal, it is necessary to receive its field synchronization signal or its segment synchronization signal with a high degree of accuracy. There have been proposed methods for receiving synchronization signals with a high degree of accuracy as disclosed in Japanese Patent Laid-Open No. 2004-242325, Japanese Patent Laid-Open No. 2005-333300 and Japanese Patent Laid-Open No. 2006-203485.

SUMMARY OF THE INVENTION

As described above, in accordance with the US digital broadcasting ATSC (Advanced Television Sub Committee) specifications, a field synchronization signal is transmitted as a signal indicating the beginning of a field. In general, a transmission channel is inferred by computing a mutual correlation between a pseudo random number signal PN511 included in the field synchronization signal and a received-signal sequence including the field synchronization signal. In addition, in order to infer a rotated-phase multipath, it is necessary to compute the mutual correlation for both I and Q signals.

FIG. 3 is a diagram showing a principle model for computing a mutual correlation between a baseband VSB signal with portions other than its field synchronization signal set at 0 and a PN511 sequence included in the field synchronization signal. With this principle model, however, at a position separated away from the principal wave by a distance corresponding to at least 150 successive symbols, pseudo echo in the range −30 dB to −20 dB is generated as shown in a diagram of FIG. 4. In particular, at each of positions separated away from the principal wave by a distance corresponding to 366, 367 and 368 successive symbols, relatively big pseudo echo in the range −20 dB to −15 dB is generated as shown in the diagram of FIG. 4. For this reason, a VSB filter 201 employed in the model shown in the diagram of FIG. 3 is a raised cosine filter centered at a frequency equal to ¼ times the symbol frequency. In addition, each of PN511 correlators 202 and 203 is a FIR filter having PN511 time inversions with coefficients of ±1. On top of that, in the case of field 1 shown in the diagram of FIG. 4, the mutual-correlation value is the value of a mutual correlation between the baseband VSB signal and the PN511 sequence in the field synchronization signal having the second sequence PN63 not inverted. In the case of field 2 shown in the diagram of FIG. 4, on the other hand, the mutual-correlation value is the value of a mutual correlation between the baseband VSB signal and the PN511 sequence in the field synchronization signal having the second sequence PN63 inverted.

This pseudo echo is generated because there is a mutual correlation between the PN511 sequence included in the field synchronization signal and prescribed symbols other than the PN511 sequence. In addition, as shown in a diagram of FIG. 5, the pseudo echo remains even if field 1 with the field synchronization signal thereof having the second sequence PN63 not inverted and field 2 with the field synchronization signal thereof having the second sequence PN63 inverted are added to each other. That is to say, pseudo echo may not be canceled even if a plurality of fields are added to each other.

For the reason described above, in a process to infer a channel by making use of the PN511 sequence prescribed by the ATSC specifications, in principle, it is difficult to detect multipath before and after a −15 dB level of pseudo echo generated at a location separated away from the principal wave by a distance corresponding to at least 300 successive symbols.

Addressing the problems described above, inventors of the present invention have proposed a pseudo-echo cancellation processing apparatus capable of inferring a channel with a high degree of precision without being affected by pseudo echo, a pseudo-echo cancellation method for the pseudo-echo cancellation processing and a digital-broadcast receiving apparatus employing the pseudo-echo cancellation processing apparatus.

Concrete merits offered by the present invention become more obvious from the following description of preferred embodiments of the present invention.

In accordance with the present invention, effects of pseudo echo can be cancelled by carrying out a complex multiplication operation on IQ signals of a complex mutual-correlation value having a large detected power in order to generate a product and adding the product to a complex mutual-correlation value lagging behind the complex mutual-correlation value having a large detected power by a delay time corresponding to successive symbols, the number of which is determined in advance.

In a pseudo-echo cancellation processing apparatus according to an embodiment of the present invention, the pseudo-echo cancellation processing apparatus employs:

a correlator for computing a complex mutual-correlation value, that is, the value of a mutual correlation between the real part of a complex baseband signal of a received input-signal sequence and a reference-signal sequence included in the input-signal sequence as well as the value of a mutual correlation between the imaginary part of the complex baseband signal and the reference-signal sequence; and a processing section configured to carry out processes of
pre-storing complex vectors each representing pseudo-echo components obtained as a result of computation of a complex mutual-correlation value, that is, the value of a mutual correlation between the real part of a complex baseband signal of a received input-signal sequence including a reference-signal sequence with portions included in the input-signal sequence as portions other than the reference-signal sequence set at 0 in advance and the reference-signal sequence as well as the value of a mutual correlation between the imaginary part of the complex baseband signal and the reference-signal sequence, detecting a complex mutual-correlation value having a peak of powers of the complex mutual-correlation values computed by the correlator from the complex mutual-correlation values computed by the correlator, delaying the detected complex mutual-correlation value by a delay time corresponding to successive symbols, the number of which is determined in advance, carrying out a complex multiplication operation to multiply a complex vector representing pseudo-echo components by the delayed complex mutual-correlation value, and adding a complex mutual-correlation value obtained as a result of execution of the complex multiplication operation to multiply a complex vector representing pseudo-echo components by the delayed complex mutual-correlation value to an original complex mutual-correlation value computed by the correlator.

The processing section employed in the pseudo-echo cancellation processing apparatus according to the embodiment of the present invention typically has:

a power computation section configured to compute the power of every complex mutual-correlation value computed by the correlator;

a peak detection section configured to detect the peak of powers each computed by the power computation section as the power of a complex mutual-correlation value computed by the correlator;

a peak storage section configured to store a complex mutual-correlation value corresponding to the peak detected by the peak detection section;

a delay section configured to delay a complex mutual-correlation value stored in the peak storage section by a delay time corresponding to successive symbols, the number of which is determined in advance;

a complex-vector storage section configured to pre-store complex vectors each representing pseudo-echo components obtained as a result of computation of a complex mutual-correlation value, that is, the value of a mutual correlation between the real part of a complex baseband signal of a received input-signal sequence including a reference-signal sequence with portions included in the input-signal sequence as portions other than the reference-signal sequence set at 0 in advance and the reference-signal sequence as well as the value of a mutual correlation between the imaginary part of the complex baseband signal and the reference-signal sequence;

a multiplication section configured to carry out a complex multiplication operation to multiply a complex vector read out from the complex-vector storage section as a complex vector representing pseudo-echo components by the delayed complex mutual-correlation value; and an addition section configured to add a complex mutual-correlation value produced by the multiplication section as a result of execution of the complex multiplication operation to multiply a complex vector read out from the complex-vector storage section as a complex vector representing pseudo-echo components by the delayed complex mutual-correlation value to an original complex mutual-correlation value computed by the correlator.

In the pseudo-echo cancellation processing apparatus according to the embodiment of the present invention, the processing section employs:

mutual-correlation-value storage means for storing the complex mutual-correlation values computed by the correlator; and processing means for carrying out processes of
pre-storing complex vectors each representing pseudo-echo components obtained as a result of computation of a complex mutual-correlation value, that is, the value of a mutual correlation between the real part of a complex baseband signal of a received input-signal sequence including a reference-signal sequence with portions included in the input-signal sequence as portions other than the reference-signal sequence set at 0 in advance and the reference-signal sequence as well as the value of a mutual correlation between the imaginary part of the complex baseband signal and the reference-signal sequence, detecting a complex mutual-correlation value having a peak of powers of the complex mutual-correlation values stored in the mutual-correlation-value storage means from the complex mutual-correlation values stored in the mutual-correlation-value storage means, delaying the detected complex mutual-correlation value by a delay time corresponding to successive symbols, the number of which is determined in advance, carrying out a complex multiplication operation to multiply a complex vector representing pseudo-echo components by the delayed complex mutual-correlation value, and adding a complex mutual-correlation value obtained as a result of execution of the complex multiplication operation to multiply a complex vector representing pseudo-echo components by the delayed complex mutual-correlation value to an original complex mutual-correlation value computed by the correlator.

The correlator employed in the pseudo-echo cancellation processing apparatus according to the embodiment of the present invention is typically a PN511 correlator for computing a complex mutual-correlation value, that is, the value of a mutual correlation between the real part of a complex baseband signal of a received input-signal sequence, which is a VSB (Vestigial Side Band) signal prescribed in the US digital broadcast ATSC (Advanced Television Sub Committee) specifications, and a PN511 sequence included in the input-signal sequence as a reference-signal sequence as well as the value of a mutual correlation between the imaginary part of the complex baseband signal and the PN11 sequence where PN is an abbreviation for Pseudo random Number.

A pseudo-echo cancellation processing method according to an embodiment of the present invention includes the steps of:

pre-storing complex vectors each representing pseudo-echo components obtained as a result of computation of a complex mutual-correlation value, that is, the value of a mutual correlation between the real part of the complex baseband signal of a received input-signal sequence including a reference-signal sequence with portions included in the input-signal sequence as portions other than the reference-signal sequence set at 0 in advance and the reference-signal sequence as well as the value of a mutual correlation between the imaginary part of the complex baseband signal and the reference-signal sequence;

computing a complex mutual-correlation value, that is, the value of a mutual correlation between the real part of a complex baseband signal of a received input-signal sequence and a reference-signal sequence included in the input-signal sequence as well as the value of a mutual correlation between the imaginary part of the complex baseband signal and the reference-signal sequence;

detecting a complex mutual-correlation value having a peak of powers of the computed complex mutual-correlation values;

delaying the detected complex mutual-correlation value by a delay time corresponding to successive symbols, the number of which is determined in advance;

carrying out a complex multiplication operation to multiply a complex vector representing pseudo-echo components by the delayed complex mutual-correlation value; and adding a complex mutual-correlation value obtained as a result of execution of the complex multiplication operation to multiply a complex vector representing pseudo-echo components by the delayed complex mutual-correlation value to the originally computed complex mutual-correlation value by the correlator.

A digital-broadcast receiving apparatus according to an embodiment of the present invention employs:

a received-signal processing section configured to carry out a process to receive a desired digital broadcast signal and obtain a complex baseband VSB (Vestigial Side Band) signal from the desired digital broadcast signal; and a pseudo-echo cancellation processing section configured to carry out a process to cancel pseudo echo on the baseband VSB signal.

In the digital-broadcast receiving apparatus, for the complex baseband VSB signal obtained by the received-signal processing section, the pseudo-echo cancellation processing section includes:

a correlator for computing a complex mutual-correlation value, that is, the value of a mutual correlation between the real part of a complex baseband VSB signal of a received input-signal sequence and a reference-signal sequence included in the input-signal sequence as well as the value of a mutual correlation between the imaginary part of the complex baseband VSB signal and the reference-signal sequence; and a processing section configured to carry out processes of
pre-storing complex vectors each representing pseudo-echo components obtained as a result of computation of a complex mutual-correlation value, that is, the value of a mutual correlation between the real part of a complex baseband VSB signal of a received input-signal sequence including a reference-signal sequence with portions included in the input-signal sequence as portions other than the reference-signal sequence set at 0 in advance and the reference-signal sequence as well as the value of a mutual correlation between the imaginary part of the VSB complex baseband signal and the reference-signal sequence, detecting a complex mutual-correlation value having a peak of powers of the complex mutual-correlation values computed by the correlator from the complex mutual-correlation values computed by the correlator, delaying the detected complex mutual-correlation value by a delay time corresponding to successive symbols, the number of which is determined in advance, carrying out a complex multiplication operation to multiply a complex vector representing pseudo-echo components by the delayed complex mutual-correlation value, and adding a complex mutual-correlation value obtained as a result of execution of a complex multiplication operation to multiply a complex vector representing pseudo-echo components by the delayed complex mutual-correlation value to an original complex mutual-correlation value computed by the correlator.

In accordance with the present invention, by pre-storing complex vectors each representing pseudo-echo components obtained as a result of computation of a complex mutual-correlation value, that is, the value of a mutual correlation between the real part of a complex baseband signal of a received input-signal sequence including a reference-signal sequence with portions included in the input-signal sequence as portions other than the reference-signal sequence set at 0 in advance and the reference-signal sequence as well as the value of a mutual correlation between the imaginary part of the complex baseband signal and the reference-signal sequence, it is possible to cancel the pseudo echo with a high degree of reliability and, hence, infer a channel with a high degree of precision without being affected by the pseudo echo.

In addition, in accordance with the present invention, the pseudo echo is found from a complex mutual-correlation value of a large power. Thus, the complex mutual-correlation value can be detected correctly even if the true multipath exists at the position of the pseudo echo.

BRIEF DESCRIPTION OF THE DRAWINGS

These and other features of the present invention will become clear from the following description of the preferred embodiments given with reference to the accompanying diagrams, in which:

FIG. 3 is a diagram showing a principle model for computing a mutual correlation between a baseband VSB signal of a received signal with portions other than its field synchronization signal set at 0 and a PN511 sequence included in the field synchronization signal;

FIG. 5 is a diagram showing that the pseudo echo remains even if field 1 with the field synchronization signal thereof having the second sequence PN63 not inverted is added to field 2 with the field synchronization signal thereof having the second sequence PN63 inverted;

FIG. 8 is a table of complex vectors 366, 367 and 368 each used in the principle model shown in the diagram of FIG. 6 and the typical operations explained by referring to the diagram of FIG. 7 as a vector for pseudo echo canceled at one of the positions separated away from the principal wave by 366, 367 and 368 successive symbols respectively.

DETAILED DESCRIPTION OF THE PREFERRED EMBODIMENTS

Preferred embodiments of the present invention are described in detail below by referring to diagrams. It is to be noted, however, that the scope of the present invention is by no means limited to the embodiments. That is to say, it is needless to say that changes can be made arbitrarily to the embodiments as long as the changes are within a range not deviating from essentials of the present invention.

Figure 1:
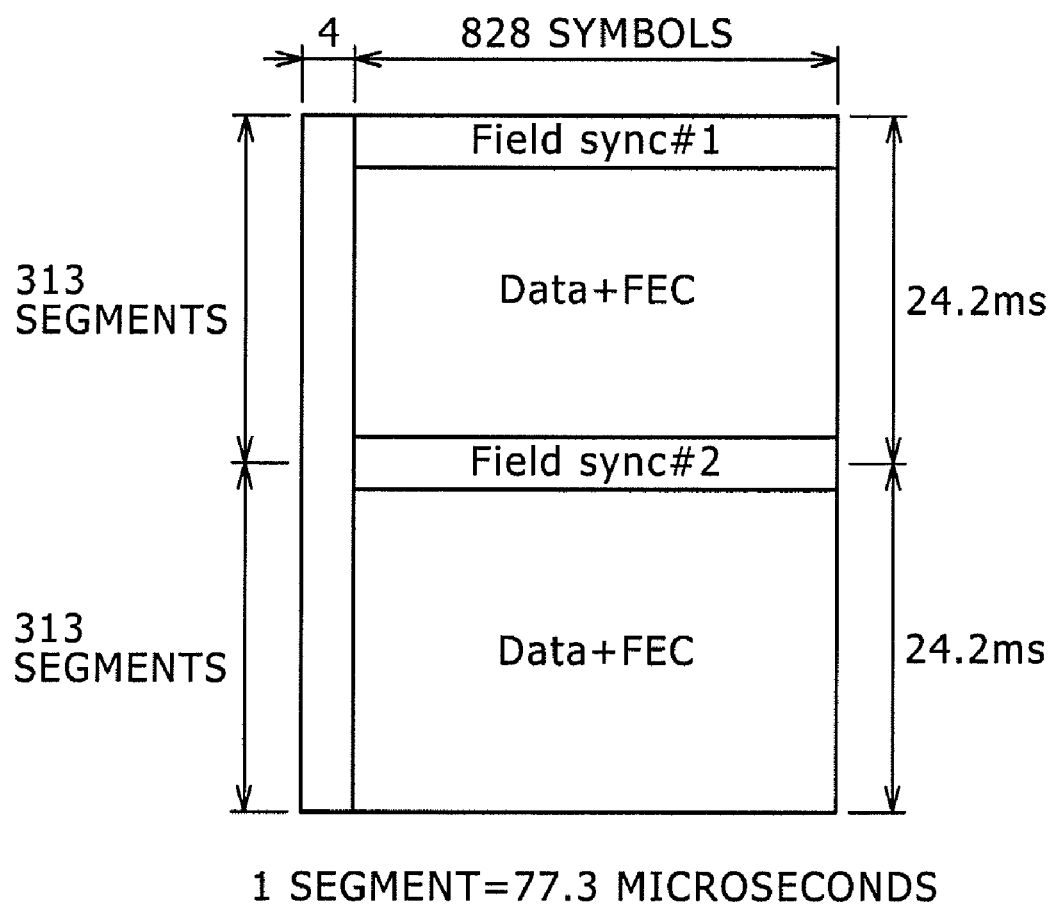
FIG. 1 is a diagram showing a model of the configuration of a VSB data frame transmitted to a DTV (Digital TV (Television)) as a frame including two fields.
Figure 2:
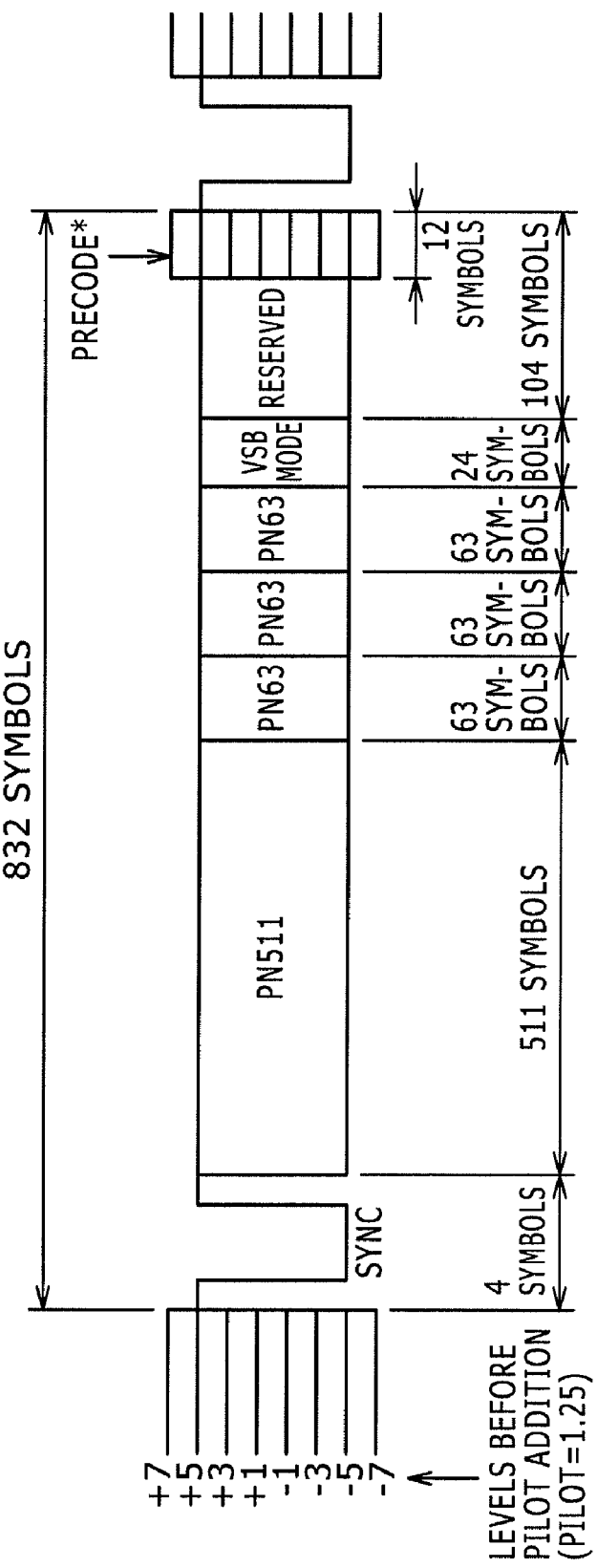
FIG. 2 is a diagram showing a model of a field synchronization signal including first four symbols serving as a segment synchronization signal of the field synchronization signal.
Figure 4:
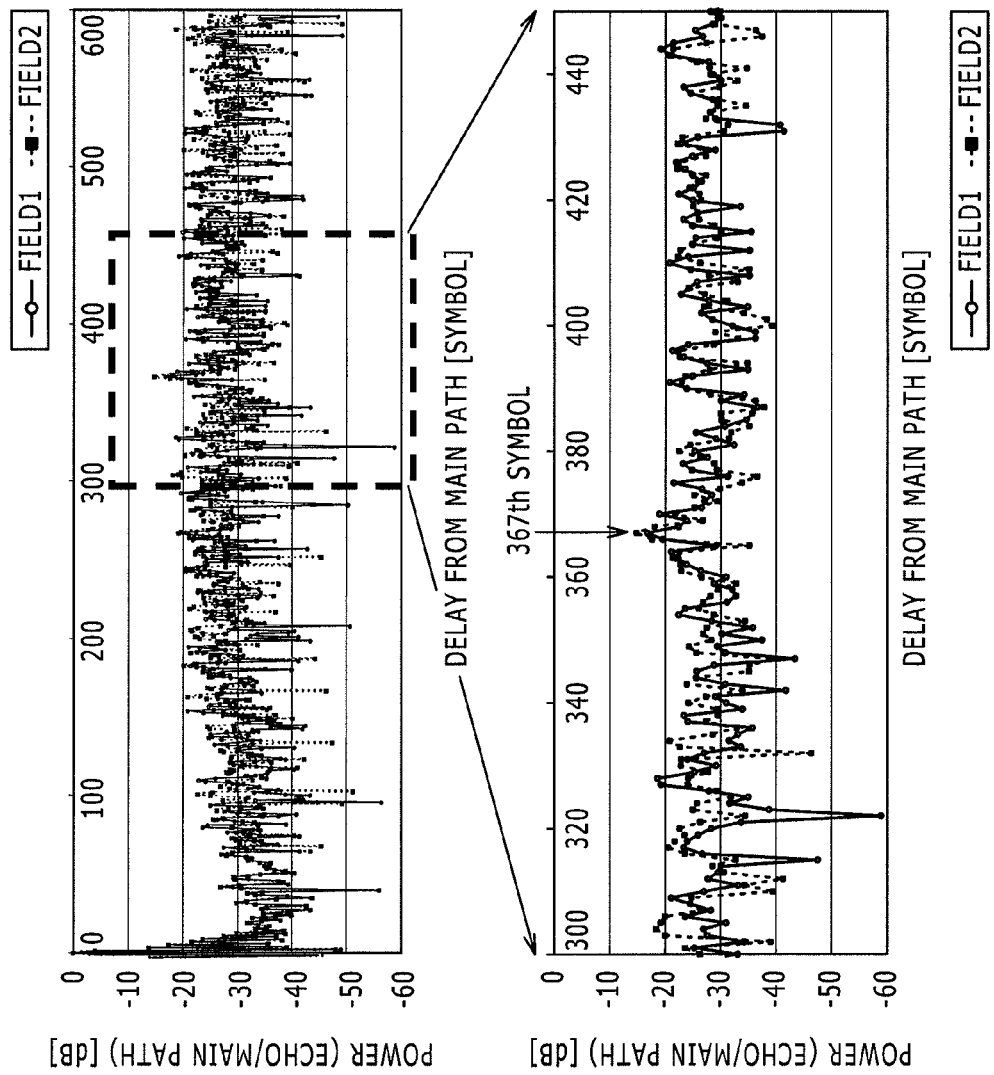
FIG. 4 is a diagram showing generation of pseudo echo for an inverted PN63 sequence and an uninverted PN63 sequence.
Figure 6:
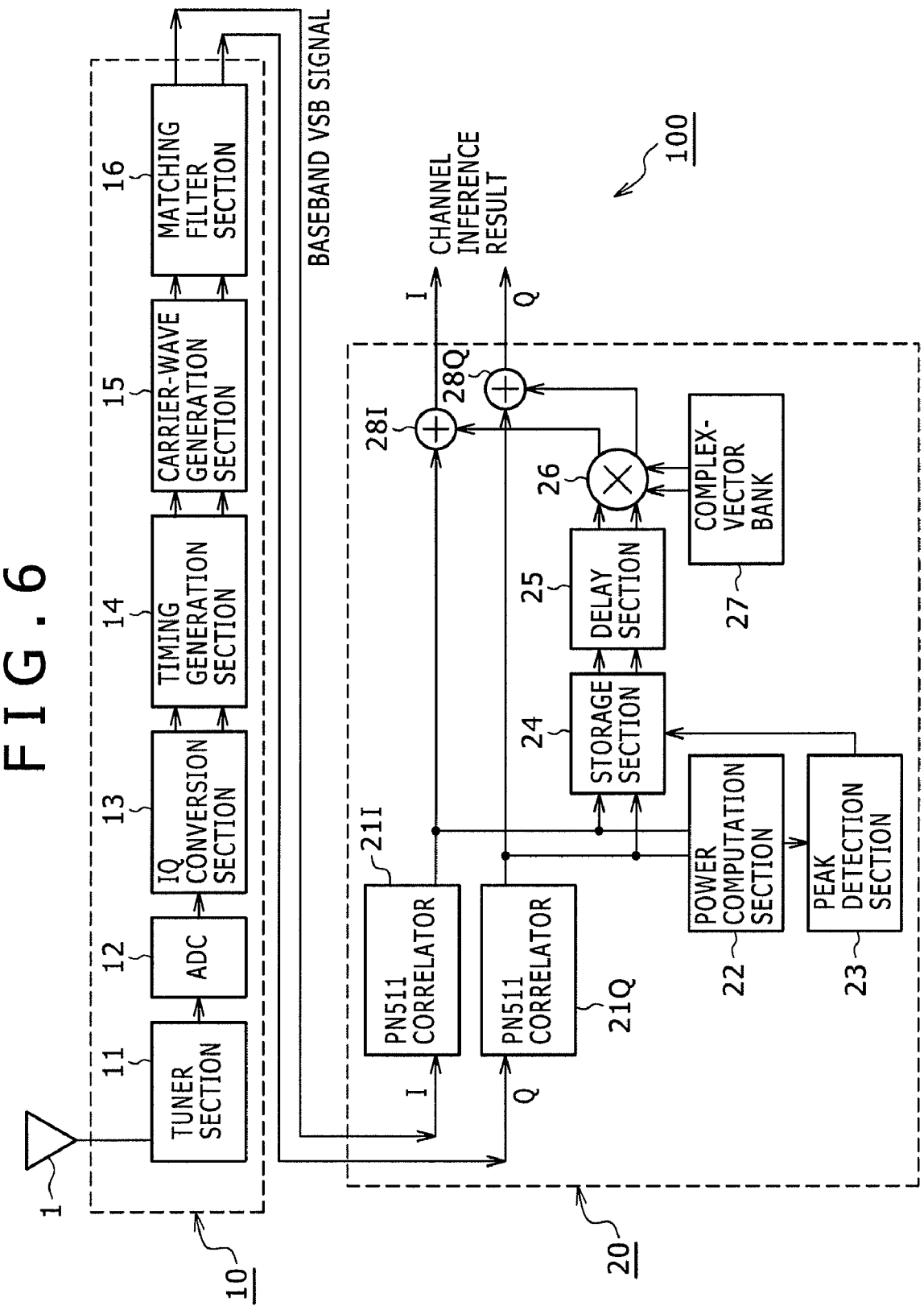
FIG. 6 is a block diagram showing the configuration of a digital-broadcast receiving apparatus to which the present invention is applied.

For example, the present invention can be applied to a digital-broadcast receiving apparatus 100 having a configuration like one shown in a diagram of FIG. 6.

The digital-broadcast receiving apparatus 100 is an apparatus for receiving a VSB (Vestigial Side Band) signal prescribed in the US digital broadcast ATSC (Advanced Television Sub Committee) specifications. As shown in the diagram of FIG. 6, the digital-broadcast receiving apparatus 100 employs a signal processing section 10 and a pseudo-echo cancellation processing section 20. The signal processing section 10 is a section for carrying out a process to receive a desired digital broadcast VSB signal from an antenna 1 and obtain a complex baseband VSB signal from the desired digital broadcast VSB signal. On the other hand, the pseudo-echo cancellation processing section 20 is a section for carrying out a process to cancel pseudo echo for the complex baseband VSB signal obtained by the signal processing section 10.

The signal processing section 10 employs a tuner section 11, an AD converter 12, an IQ conversion section 13, a timing reproduction section 14, a carrier-wave reproduction section 15 and a matching-filter section 16.

The tuner section 11 employed in the signal processing section 10 is a section for receiving the digital broadcast signal from the antenna 1, converting the broadcast signal into an IF (Intermediate Frequency) signal and supplying the IF signal to the AD converter 12.

The AD converter 12 is a section for converting the analog IF signal received from the tuner section 11 into a digital signal and supplying the digital signal to the IQ conversion section 13 as a digital IF signal.

The IQ conversion section 13 is a section for converting the digital IF signal received from the AD converter 12 into a complex baseband VSB signal and supplying the I and Q signals of the complex baseband VSB signal to the matching-filter section 16 by way of the timing reproduction section 14 and the carrier-wave reproduction section 15.

The timing reproduction section 14 and the carrier-wave reproduction section 15 are sections for synchronizing the I and Q signals received from the IQ conversion section 13 as the IQ signals of the complex baseband VSB signal to a symbol timing on the receiver side and the carrier wave respectively before supplying the synchronized I and Q signals to the matching-filter section 16 which finally outputs the IQ signals of the complex baseband VSB signal to the pseudo-echo cancellation processing section 20.

The pseudo-echo cancellation processing section 20 employs two correlators, namely, a real-part PN511 correlator 21I and an imaginary-part PN511 correlator 21Q, a power computation section 22, a peak detection section 23, a storage section 24, a delay section 25, a multiplication section 26, a complex-vector bank 27 as well as two adders, namely, a real-part adder 28I and an imaginary-part adder 28Q.

The real-part PN511 correlator 21I computes a mutual correlation between the I signal received from the signal processing section 10 as the I signal of the complex baseband VSB signal and the PN511 sequence in order to generate a mutual-correlation value I. By the same token, the imaginary-part PN511 correlator 21Q computes a mutual correlation between the Q signal received from the signal processing section 10 as the Q signal of the complex baseband VSB signal and the PN511 sequence in order to generate a mutual-correlation value Q. The real-part PN511 correlator 21I then supplies the mutual-correlation value I to the power computation section 22, the storage section 24 and the real-part adder 28I. By the same token, the imaginary-part PN511 correlator 21Q then supplies the mutual-correlation value Q to the power computation section 22, the storage section 24 and the imaginary-part adder 28Q.

The power computation section 22 is a section for carrying out a power computation process by adding the square of a real part I to the square of an imaginary part Q. The real part I is the mutual-correlation value I received from the real-part PN511 correlator 21I whereas the imaginary part Q is the mutual-correlation value Q received from the imaginary-part PN511 correlator 21Q.

The peak detection section 23 is a section for detecting the peak of the powers of the complex mutual relation values IQ received from the power computation section 22.

At a point of time the peak is detected by the peak detection section 23, the peak detection section 23 drives the storage section 24 to store the complex mutual-correlation value IQ of a symbol therein as a complex mutual-correlation value IQ corresponding to the detected peak. The complex mutual-correlation value IQ stored in the storage section 24 includes the real part I and the imaginary part Q, which are generated by the real-part PN511 correlator 21I and the imaginary-part PN511 correlator 21Q respectively. The complex mutual-correlation value IQ is then read out from the storage section 24 to be delayed by the delay section 25 by a delay time corresponding to successive symbols, the number of which is determined in advance. The delay section 25 then supplies the delayed complex mutual-correlation value IQ to the multiplication section 26. The multiplication section 26 is a section for carrying out a complex multiplication process to multiply the delayed complex mutual-correlation value IQ by a complex vector, which is read out from the complex-vector bank 27 as a vector representing pseudo-echo components corresponding to the delay time represented by the predetermined number of symbols.

The complex-vector bank 27 is a memory used for pre-storing complex vectors each representing pseudo-echo components obtained as a result of computation of a complex mutual-correlation value, that is, the value of a mutual correlation between the real part of the complex baseband VSB signal of a received input-signal sequence including a PN511 sequence in the field synchronization signal thereof with portions included in the input-signal sequence as portions other than the field synchronization signal set at 0 in advance and the PN511 sequence as well as the value of a mutual correlation between the imaginary part of the complex baseband VSB signal and the PN511 sequence.

A complex mutual-correlation value obtained as a result of the complex multiplication process carried out by the multiplication section 26 includes a mutual-correlation real part I and a mutual-correlation imaginary part Q. The multiplication section 26 supplies the mutual-correlation real part I and the mutual-correlation imaginary part Q to the real-part adder 28I and the imaginary-part adder 28Q respectively as pseudo-echo cancellation signals. The real-part adder 28I adds the mutual-correlation real part I to the mutual-correlation value I generated by the real-part PN511 correlator 21I whereas the imaginary-part adder 28Q adds the mutual-correlation imaginary part Q to the mutual-correlation value Q generated by the imaginary-part PN511 correlator 21Q in order to cancel pseudo echo from the baseband VSB signal obtained by the signal processing section 10.

Figure 7:
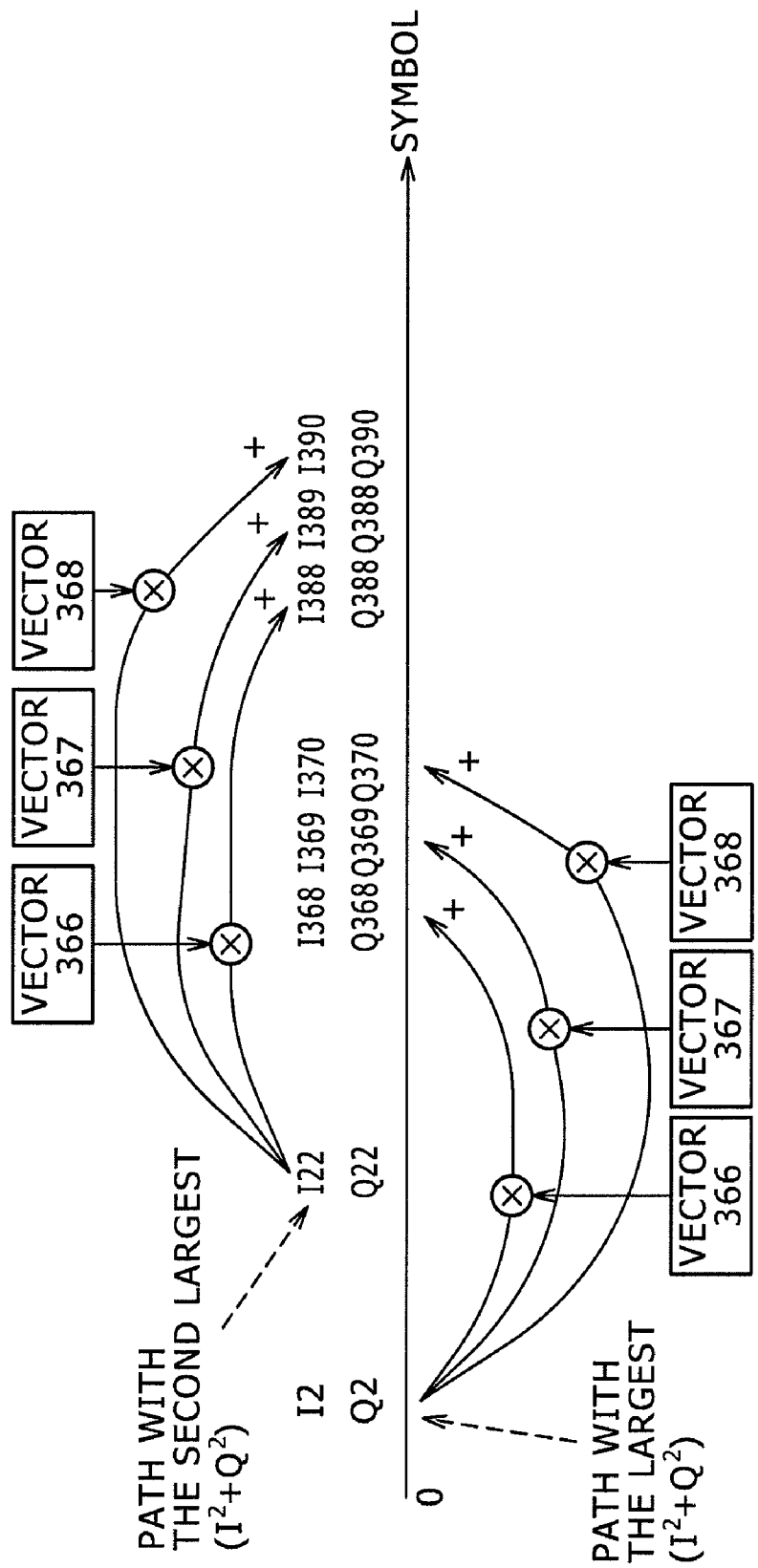
FIG. 7 is a diagram showing a model to be referred to in description of typical operations carried out by a pseudo-echo cancellation processing section employed in the digital-broadcast receiving apparatus shown in the block diagram of FIG. 6.

FIG. 7 is a diagram referred to in description of typical operations carried out by the pseudo-echo cancellation processing section 20 employed in the digital-broadcast receiving apparatus 100.

In the typical operations explained by referring to the diagram of FIG. 7, the peak detection section 23 detects two complex mutual-correlation values each having a large power expressed by $(I^2+Q^2)$ for the $2^{nd}$ and $22^{nd}$ symbols respectively where notation I denotes the real part of the complex mutual-relation value and notation Q denotes the imaginary part of the complex mutual-relation value. In the diagram of FIG. 7, one of the two detected complex mutual-correlation values for the $2^{nd}$ symbol includes a real part I2 and an imaginary part Q2 whereas the other detected complex mutual-correlation value for the $22^{nd}$ symbol includes a real part I22 and an imaginary part Q22. One of the two detected complex mutual-correlation values has a largest power of $(I2^2+Q2^2)$ whereas the other detected complex mutual-correlation value has a second largest power of $(I22^2+Q22^2)$. The delay section 25 then delays the detected complex mutual-correlation value including of the real part I2 and the imaginary part Q2 as well as the complex mutual-correlation value including of the real part I22 and the imaginary part Q22 by three different delay times corresponding to 366, 367 and 368 successive symbols respectively. Subsequently, the multiplication section 26 carries out complex multiplication operations to multiply the delayed complex mutual-correlation value including of the real part I2 and the imaginary part Q2 as well as the delayed complex mutual-correlation value including of the real part I22 and the imaginary part Q22 by complex vectors 366, 367 and 368.

In the typical operations explained by referring to the diagram of FIG. 7, the number of complex mutual-correlation values to be multiplied by complex vectors in complex multiplication operations is two. It is to be noted, however, that the number of complex mutual-correlation values to be multiplied by complex vectors in complex multiplication operations can be increased in accordance with the demanded precision. In addition, relatively big pseudo echo is canceled at each of positions separated away from the principal wave by 366, 367 and 368 successive symbols. In accordance with the demanded precision, however, the complex multiplication and addition operations described above can also be carried out for pseudo echo other than the pseudo echo canceled at each of the positions.

FIG. 8 is a table of components i and q of complex vectors 366, 367 and 368 each used in the principle model shown in the diagram of FIG. 6 and in the typical operations explained by referring to the diagram of FIG. 7 as a vector for pseudo echo canceled at one of the positions separated away from the principal wave by 366, 367 and 368 successive symbols respectively. In the case of an inverted second PN63 sequence for field 2, the pseudo-echo cancellation processing section 20 makes use of the values of complex vectors shown on the two columns in the middle of the table of FIG. 8 as values for the inverted second PN63 sequence. In the case of an uninverted second PN63 sequence field 1, on the other hand, the pseudo-echo cancellation processing section 20 makes use of the values of complex vectors shown on the two columns on the left-hand side in the table of FIG. 8 as values for the uninverted second PN63 sequence. Thus, in principle, pseudo echo can be canceled completely.

If the pseudo-echo cancellation processing section 20 is not capable of determining whether the second PN63 sequence is an inverted or uninverted second PN63 sequence, the pseudo-echo cancellation processing section 20 makes use of averages computed from the values of complex vectors shown in the table of FIG. 8 as values for the inverted and uninverted second PN63 sequences. Thus, from a practical point of view, pseudo echo can be suppressed sufficiently.

The pseudo-echo cancellation processing apparatus according to an embodiment of the present invention is the pseudo-echo cancellation processing section 20 employed in the digital-broadcast receiving apparatus 100.

Figure 9:
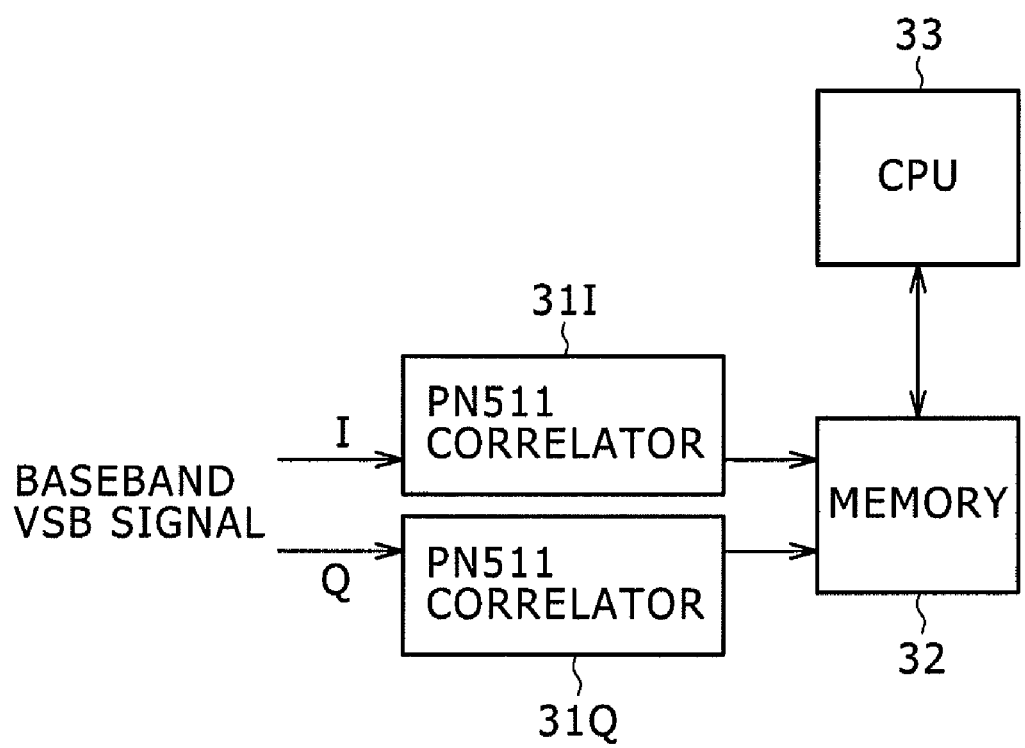
FIG. 9 is a block diagram showing a typical configuration of another pseudo-echo cancellation processing section employed in the digital-broadcast receiving apparatus shown in the block diagram of FIG. 6.

In place of the pseudo-echo cancellation processing section 20 employed in the digital-broadcast receiving apparatus 100, it is also possible to employ another pseudo-echo cancellation processing section 30 having a configuration like one shown in a diagram of FIG. 9 as a pseudo-echo cancellation processing section according to another embodiment of the present invention.

As shown in the diagram of FIG. 9, the other pseudo-echo cancellation processing section 30 employs two correlators, namely, a real-part PN511 correlator 31I and an imaginary-part PN511 correlator 31Q, a memory 32 as well as a CPU 33. The real-part PN511 correlator 31I computes a mutual correlation between the I signal received from the signal processing section 10 as the I signal of the complex baseband VSB signal and the PN511 sequence in order to generate a mutual-correlation value I. By the same token, the imaginary-part PN511 correlator 31Q computes a mutual correlation between the Q signal received from the signal processing section 10 as the Q signal of the complex baseband VSB signal and the PN511 sequence in order to generate a mutual-correlation value Q. The real-part PN511 correlator 31I and the imaginary-part PN511 correlator 31Q then store the mutual-correlation values I and Q respectively in the memory 32. The CPU 33 executes software processing in order to carry out the peak detection process, the complex vector multiplication operation to multiply a complex vector by a complex mutual-correlation value corresponding to the detected peak and the process to add a complex mutual-correlation value obtained a result of the complex multiplication operation to a complex mutual-correlation value computed after the lapse of time corresponding to successive symbols, the number of which is determined in advance.

The embodiments each described above as an embodiment of the present invention applies the present invention to the digital-broadcast receiving apparatus 100 for receiving a VSB (Vestigial Side Band) signal prescribed in the US digital broadcast ATSC (Advanced Television Sub Committee) specifications. In the other pseudo-echo cancellation processing section 30 employed in the digital-broadcast receiving apparatus 100 as a pseudo-echo cancellation processing section according to the other embodiment of the present invention, the memory 32 is used in place of the complex-vector bank 27 and the storage section 24, which are employed in the pseudo-echo cancellation processing section 20 of the digital-broadcast receiving apparatus 100. As described earlier, the complex-vector bank 27 of the pseudo-echo cancellation processing section 20 employed in the digital-broadcast receiving apparatus 100 is used for pre-storing complex vectors each representing pseudo-echo components obtained as a result of computation of a complex mutual-correlation value, that is, the value of a mutual correlation between the real part of a complex baseband VSB signal of the VSB signal serving as a received input-signal sequence including a field synchronization signal with portions included in the input-signal sequence as portions other than the field synchronization signal set at 0 in advance and a PN511 sequence included in the field synchronization signal as well as the value of a mutual correlation between the imaginary part of the complex baseband VSB signal and the PN511 sequence. The real-part PN511 correlator 31I employed in the other pseudo-echo cancellation processing section 30 computes a mutual correlation between the I signal received from the signal processing section 10 as the I signal of the complex baseband VSB signal and the PN511 sequence in order to generate a mutual-correlation value I. By the same token, the imaginary-part PN511 correlator 31Q computes a mutual correlation between the Q signal received from the signal processing section 10 as the Q signal of the complex baseband VSB signal and the PN511 sequence in order to generate a mutual-correlation value Q. The real-part PN511 correlator 31I and the imaginary-part PN511 correlator 31Q then store the mutual-correlation values I and Q respectively in the memory 32. The CPU 33 executes software processing in order to carry out the peak detection process, the complex vector multiplication operation to multiply a complex vector by a complex mutual-correlation value corresponding to the detected peak and the process to add a complex mutual-correlation value obtained a result of the complex multiplication operation to a complex mutual-correlation value computed after the lapse of time corresponding to successive symbols, the number of which is determined in advance. Thus, the pseudo echo can be canceled.

However, the scope of the present invention is by no means limited to the embodiments described above. That is to say, the present invention can be applied to any digital-broadcast receiving apparatus for receiving a digital broadcast signal according to other specifications as long as the digital-broadcast receiving apparatus includes:
  a correlator for computing a complex mutual-correlation value, that is, the value of a mutual correlation between the real part of a complex baseband signal of a received input-signal sequence and a reference-signal sequence included in the input-signal sequence as well as the value of a mutual correlation between the imaginary part of the complex baseband signal and the reference-signal sequence; and
  a processing section for carrying out processes of:
  pre-storing complex vectors each representing pseudo-echo components obtained as a result of computation of a complex mutual-correlation value, that is, the value of a mutual correlation between the real part of a complex baseband signal of a received input-signal sequence including a reference-signal sequence with portions included in the input-signal sequence as portions other than the reference-signal sequence set at 0 in advance and the reference-signal sequence as well as the value of a mutual correlation between the imaginary part of the complex baseband signal and the reference-signal sequence;
  detecting a complex mutual-correlation value having a peak of powers of the complex mutual-correlation values computed by the correlator from the complex mutual-correlation values computed by the correlator;
  delaying the detected complex mutual-correlation value by a delay time corresponding to successive symbols, the number of which is determined in advance;
  carrying out a complex multiplication operation to multiply a complex vector representing pseudo-echo components by the delayed complex mutual-correlation value; and
  adding a complex mutual-correlation value obtained as a result of execution of the complex multiplication operation to multiply a complex vector representing pseudo-echo components by the delayed complex mutual-correlation value to an original complex mutual-correlation value computed by the correlator.

It is thus possible to cancel the pseudo echo with a high degree of reliability and, hence, infer a channel with a high degree of precision without being affected by the pseudo echo. In addition, in accordance with the present invention, the pseudo echo is found from a mutual-correlation value for a large power. Thus, the mutual-correlation value can be detected correctly even if the true multipath exists at the position of the pseudo echo.

In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A pseudo-echo cancellation processing apparatus comprising:
a correlator for computing a complex mutual-correlation value, that is, the value of a mutual correlation between the real part of a complex baseband signal of a received input-signal sequence and a reference-signal sequence included in said input-signal sequence as well as the value of a mutual correlation between the imaginary part of said complex baseband signal and said reference-signal sequence; and
a processing section configured to carry out processes of
pre-storing complex vectors each representing pseudo-echo components obtained as a result of computation of a complex mutual-correlation value, that is, the value of a mutual correlation between the real part of a complex baseband signal of a received input-signal sequence including a reference-signal sequence with portions included in said input-signal sequence as portions other than said reference-signal sequence set at 0 in advance and said reference-signal sequence as well as the value of a mutual correlation between the imaginary part of said complex baseband signal and said reference-signal sequence,
detecting a complex mutual-correlation value having a peak of powers of said complex mutual-correlation values computed by said correlator from said complex mutual-correlation values computed by said correlator,
delaying said detected complex mutual-correlation value by a delay time corresponding to successive symbols, the number of which is determined in advance,
carrying out a complex multiplication operation to multiply a complex vector representing pseudo-echo components by said delayed complex mutual-correlation value, and
adding a complex mutual-correlation value obtained as a result of execution of said complex multiplication operation to multiply a complex vector representing pseudo-echo components by said delayed complex mutual-correlation value to an original complex mutual-correlation value computed by said correlator.

2. The pseudo-echo cancellation processing apparatus according to claim 1 wherein said processing section comprises:
a power computation section configured to compute the power of each complex mutual-correlation value computed by said correlator;
a peak detection section configured to detect the peak of powers each computed by said power computation section as the power of said complex mutual-correlation value computed by said correlator;
a peak storage section configured to store a complex mutual-correlation value corresponding to said peak detected by said peak detection section;
a delay section configured to delay a complex mutual-correlation value stored in said peak storage section by a delay time corresponding to successive symbols, the number of which is determined in advance;
a complex-vector storage section configured to pre-store complex vectors each representing pseudo-echo components obtained as a result of computation of a complex mutual-correlation value, that is, the value of a mutual correlation between the real part of a complex baseband signal of a received input-signal sequence including a reference-signal sequence with portions included in said input-signal sequence as portions other than said reference-signal sequence set at 0 in advance and said reference-signal sequence as well as the value of a mutual correlation between the imaginary part of said complex baseband signal and said reference-signal sequence;
a multiplication section configured to carry out a complex multiplication operation to multiply a complex vector read out from said complex-vector storage section as a complex vector representing pseudo-echo components by said delayed complex mutual-correlation value; and
an addition section configured to add a complex mutual-correlation value produced by said multiplication section as a result of execution of said complex multiplication operation to multiply a complex vector read out from said complex-vector storage section as a complex vector representing pseudo-echo components by said delayed complex mutual-correlation value to an original complex mutual-correlation value computed by said correlator.

3. The pseudo-echo cancellation processing apparatus according to claim 1 wherein said processing section comprises:
mutual-correlation-value storage means for storing said complex mutual-correlation values computed by said correlator; and
processing means for carrying out processes of
pre-storing complex vectors each representing pseudo-echo components obtained as a result of computation of a complex mutual-correlation value, that is, the value of a mutual correlation between the real part of a complex baseband signal of a received input-signal sequence including a reference-signal sequence with portions included in said input-signal sequence as portions other than said reference-signal sequence set at 0 in advance and said reference-signal sequence as well as the value of a mutual correlation between the imaginary part of said complex baseband signal and said reference-signal sequence,
detecting a complex mutual-correlation value having a peak of powers of said complex mutual-correlation values stored in said mutual-correlation-value storage means from said complex mutual-correlation values stored in said mutual-correlation-value storage means,
delaying said detected complex mutual-correlation value by a delay time corresponding to successive symbols, the number of which is determined in advance,
carrying out a complex multiplication operation to multiply a complex vector representing pseudo-echo components by said delayed complex mutual-correlation value, and
adding a complex mutual-correlation value obtained as a result of execution of said complex multiplication operation to multiply a complex vector representing pseudo-echo components by said delayed complex mutual-correlation value to an original complex mutual-correlation value computed by said correlator.

4. The pseudo-echo cancellation processing apparatus according to claim 1, wherein said correlator is typically a PN511 correlator for computing a complex mutual-correlation value, that is, the value of a mutual correlation between the real part of a complex baseband signal of a received input-signal sequence, which is a Vestigial Side Band signal prescribed in the United States digital broadcast Advanced Television Sub Committee specifications, and a PN511 sequence included in said input-signal sequence as a reference-signal sequence as well as the value of a mutual correlation between the imaginary part of said complex baseband signal and said PN511 where PN is an abbreviation for Pseudo random Number.

5. A pseudo-echo cancellation processing method comprising the steps of:
   pre-storing complex vectors each representing pseudo-echo components obtained as a result of computation of a complex mutual-correlation value, that is, the value of a mutual correlation between the real part of a complex baseband signal of a received input-signal sequence including a reference-signal sequence with portions included in said input-signal sequence as portions other than said reference-signal sequence set at 0 in advance and said reference-signal sequence as well as the value of a mutual correlation between the imaginary part of said complex baseband signal and said reference-signal sequence;
   computing a complex mutual-correlation value, that is, the value of a mutual correlation between the real part of a complex baseband signal of a received input-signal sequence and a reference-signal sequence included in said input-signal sequence as well as the value of a mutual correlation between the imaginary part of said complex baseband signal and said reference-signal sequence;
   detecting a complex mutual-correlation value having a peak of powers of said computed complex mutual-correlation values;
   delaying said detected complex mutual-correlation value by a delay time corresponding to successive symbols, the number of which is determined in advance;
   carrying out a complex multiplication operation to multiply a complex vector representing pseudo-echo components by said delayed complex mutual-correlation value; and
   adding a complex mutual-correlation value obtained as a result of execution of said complex multiplication operation to multiply a complex vector representing pseudo-echo components by said delayed complex mutual-correlation value to said originally computed complex mutual-correlation value by said correlator.

6. A digital-broadcast receiving apparatus comprising:
   a received-signal processing section configured to carry out a process to receive a desired digital broadcast signal and obtain a complex baseband Vestigial Side Band signal from said desired digital broadcast signal; and
   a pseudo-echo cancellation processing section configured to carry out a process to cancel pseudo echo on said complex baseband Vestigial Side Band signal,
   wherein, for said complex baseband Vestigial Side Band signal obtained by said received-signal processing section, said pseudo-echo cancellation processing section includes
      a correlator for computing a complex mutual-correlation value, that is, the value of a mutual correlation between the real part of a complex baseband Vestigial Side Band signal of a received input-signal sequence and a reference-signal sequence included in said input-signal sequence as well as the value of a mutual correlation between the imaginary part of said complex baseband Vestigial Side Band signal and said reference-signal sequence, and
      a processing section configured to carry out processes of
      pre-storing complex vectors each representing pseudo-echo components obtained as a result of computation of a complex mutual-correlation value, that is, the value of a mutual correlation between the real part of a complex baseband Vestigial Side Band signal of a received input-signal sequence including a reference-signal sequence with portions included in said input-signal sequence as portions other than said reference-signal sequence set at 0 in advance and said reference-signal sequence as well as the value of a mutual correlation between the imaginary part of said complex baseband Vestigial Side Band signal and said reference-signal sequence,
      detecting a complex mutual-correlation value having a peak of powers of said complex mutual-correlation values computed by said correlator from said complex mutual-correlation values computed by said correlator,
      delaying said detected complex mutual-correlation value by a delay time corresponding to successive symbols, the number of which is determined in advance,
      carrying out a complex multiplication operation to multiply a complex vector representing pseudo-echo components by said delayed complex mutual-correlation value, and
      adding a complex mutual-correlation value obtained as a result of execution of the complex multiplication operation to multiply a complex vector representing pseudo-echo components by said delayed complex mutual-correlation value to an originally complex mutual-correlation value computed by said correlator.

7. A digital-broadcast receiving apparatus comprising:
   received-signal processing means for carrying out a process to receive a desired digital broadcast signal and obtain a complex baseband Vestigial Side Band signal from said desired digital broadcast signal; and
   pseudo-echo cancellation processing means for carrying out a process to cancel pseudo echo on said complex baseband Vestigial Side Band signal,
   wherein, for said complex baseband Vestigial Side Band signal obtained by said received-signal processing means, said pseudo-echo cancellation processing means includes
      a correlator for computing a complex mutual-correlation value, that is, the value of a mutual correlation between the real part of a complex baseband Vestigial Side Band signal of a received input-signal sequence and a reference-signal sequence included in said input-signal sequence as well as the value of a mutual correlation between the imaginary part of said complex baseband Vestigial Side Band signal and said reference-signal sequence, and
      a processing section configured to carry out processes of
      pre-storing complex vectors each representing pseudo-echo components obtained as a result of computation of a complex mutual-correlation value, that is, the value of a mutual correlation between the real part of a complex baseband Vestigial Side Band signal of a received input-signal sequence including a reference-signal sequence with portions included in said input-signal sequence as portions other than said reference-signal sequence set at 0 in advance and said reference-signal sequence as well as the value of a mutual correlation between the imaginary part of said complex baseband Vestigial Side Band signal and said reference-signal sequence, detecting a complex mutual-correlation value having a peak of powers of said complex mutual-correlation values computed by said correlator from said complex mutual-correlation values computed by said correlator, delaying said detected complex mutual-correlation value by a delay time corresponding to successive symbols, the number of which is determined in advance, carrying out a complex multiplication operation to multiply a complex vector representing pseudo-echo components by said delayed complex mutual-correlation value, and adding a complex mutual-correlation value obtained as a result of execution of the complex multiplication operation to multiply a complex vector representing pseudo-echo components by said delayed complex mutual-correlation value to an originally complex mutual-correlation value computed by said correlator.

* * * * *